No. 813,677. PATENTED FEB. 27, 1906.
F. W. STILLWELL.
COMBINED BAYONET AND TELESCOPE.
APPLICATION FILED MAR. 17, 1905.
2 SHEETS—SHEET 1.
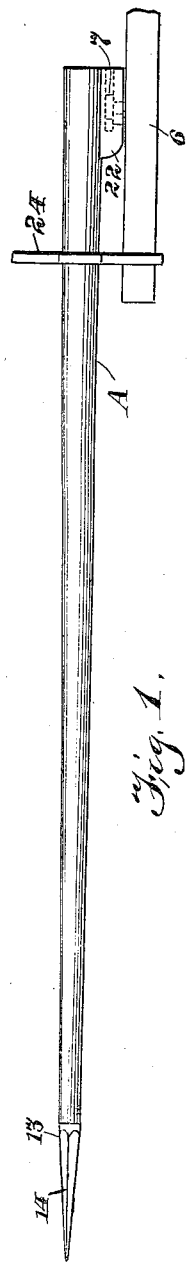
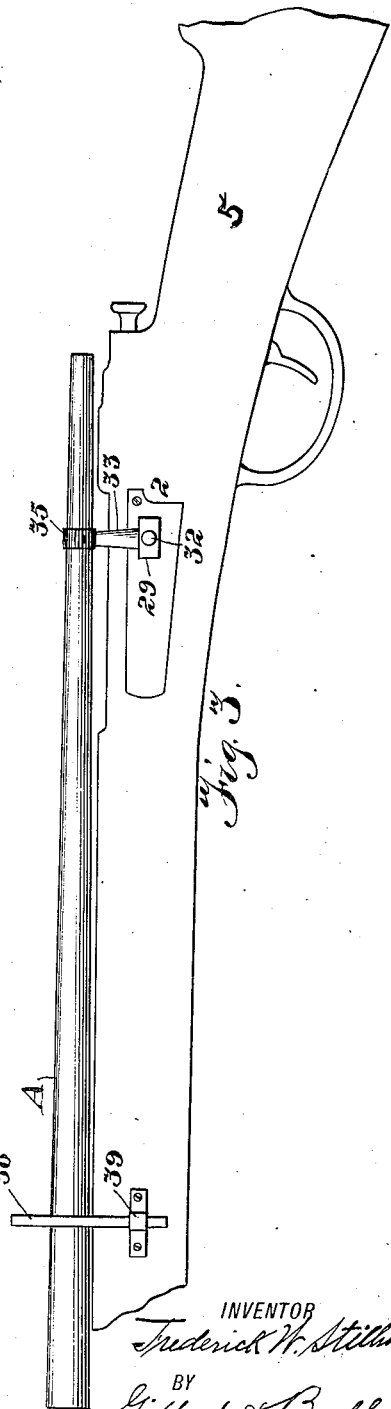
WITNESSES:
INVENTOR
Frederick W. Stillwell
BY
Gifford & Bull
ATTORNEYS No. 813,677. PATENTED FEB. 27, 1906.
F. W. STILLWELL.
COMBINED BAYONET AND TELESCOPE.
APPLICATION FILED MAR. 17, 1905.
2 SHEETS—SHEET 2.
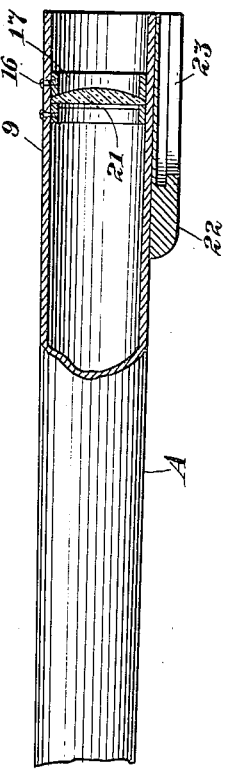
Fig. 4.
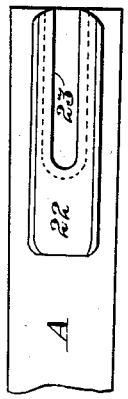
Fig. 2.
Fig. 10.
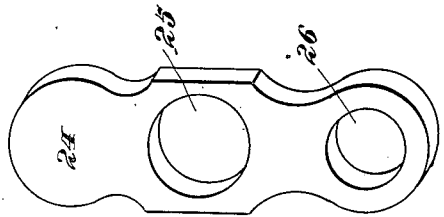
Fig. 9.
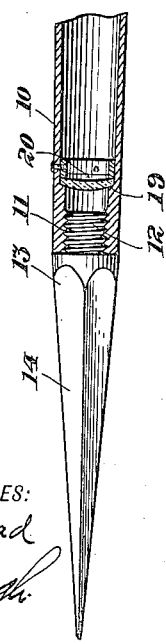
Fig. 6.
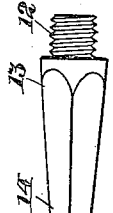
Fig. 5.
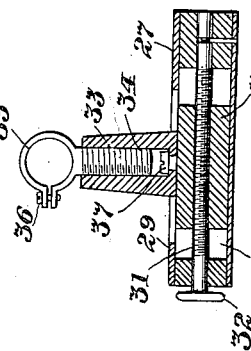
Fig. 8.
WITNESSES:
Robert Head
F. B. Cavanagh
INVENTOR
Frederick W. Stillwell
BY
Gifford & Bull
ATTORNEYS

UNITED STATES PATENT OFFICE.

FREDERICK W. STILLWELL, OF SCRANTON, PENNSYLVANIA.

COMBINED BAYONET AND TELESCOPE.

No. 813,677.  Specification of Letters Patent.  Patented Feb. 27, 1906.

Application filed March 17, 1905. Serial No. 250,545.

*To all whom it may concern:*

Be it known that I, FREDERICK W. STILLWELL, a citizen of the United States, and a resident of Scranton, in the county of Lackawanna and State of Pennsylvania, have invented certain new and useful Improvements in a Combined Bayonet and Telescope, of which the following is a specification.

My invention relates to an improved combined bayonet and telescope adapted especially for use in connection with rifles.

It is my intention to provide a device which may be attached to the barrel of a gun, such as a rifle-gun, in an ordinary and well-known manner when being used as a bayonet, the body portion of the bayonet being tubular in construction and containing a lens, so that the device may also be employed as a telescope when the occasion requires. I have also in view so mounting the device when employed as a telescope that it may be elevated and adjusted to compensate for variations in the velocity of the wind and the like.

To the accomplishment of these and others ends my invention consists in the construction, combination, and arangement of parts set forth in and falling within the scope of the appended claims.

In the accompanying drawings like characters of reference indicate like parts in all the views.

Figure 1 shows the device attached to a rifle of the Krag-Jorgensen type and in position for use as a bayonet. Fig. 2 shows a bayonet attached to a rifle-barrel with the ordinary bayonet-sleeve, such as is used in connection with the Springfield rifle. Fig. 3 shows the position of a bayonet when used as a telescope, the body being reversed and secured alongside the rifle-barrel at or near the stock thereof. Fig. 4 is an enlarged detail view, partly in section, showing the construction of the bayonet-tube and showing the lens positioned in the bayonet, such view also illustrating the manner of securing the bayonet-tip to the tubular body. Figs. 5 and 6 are detail views of the bayonet-tip. Fig. 7 is a detail view of the lens. Fig. 8 is an enlarged vertical sectional view taken through the mounting employed for supporting the device as a telescope alongside the barrel of the gun. Fig. 9 is a view of the guard of the bayonet, and Fig. 10 shows a portion of a bayonet-body having a slot for securing the same to the rifle-barrel.

Referring now to the accompanying drawings in detail, the numeral 5 indicates the stock of a rifle, and the barrel thereof is shown at 6. In Fig. 1 this barrel 6 is of the type used in connection with the Krag-Jorgensen arm, being distinguished by having the headed stud 7 secured thereto, said stud being designed to secure the bayonet to the barrel. In Fig. 2 the rifle-barrel 6 may be considered as a part of the Springfield arm, and the bayonet in this type is adapted to be connected to the barrel through the medium of the ordinary bayonet sleeve and catch 8.

In Fig. 4 I have shown my improved bayonet and telescope in detail, and in such view the letter A indicates the body portion of the bayonet, which, as will be noted, is tubular in form and tapers from the end 9 toward the outer end 10, so that such tube is of relatively greater cross-diameter at its end portion 9 than at 10. At the reduced end portion 10 of the tube the interior is threaded, as at 11, to receive the screw-stud 12, rigidly fixed to the bayonet-tip 13. This tip, which may be of any desired shape in cross-section, has a number of faces or sides 14 gradually tapering to a sharp point 15. Within the cylindrical tubular portion of the body of the bayonet I secure a plurality of lenses, the large lens 16 having its frame 17 arranged near the relatively wide end of the tube, while the small lens 19 is secured with its frame 20 near the tip end portion. These lenses are of any approved character and are provided with the ordinary cross-hairs 21. In Fig. 4 I have shown the body A provided with an under plate or pommel 22, having a T-shaped slot 23 cut longitudinally therein, adapted to receive and lock with a stud 7 when used in connection with the Krag-Jorgensen gun. When used in connection with the Springfield arm, an ordinary bayonet 8 is employed and is slipped over the barrel 6 and locked thereto in the usual manner. When employed in connection with the Krag-Jorgensen arm, I also employ a guard 24, which is shown in detail in Fig. 9, the position of such guard when used in connection with the barrel and rifle being shown in Fig. 1. As will be seen by referring to the said Fig. 9, this guard comprises an elongated plate having openings 25 and 26 cut therein, the opening 25 being designed for the passage of the body portion of the bayonet, while that at 26 is adapted to permit the extreme end of the rifle-barrel 6 to project therethrough.

When the combined bayonet and telescope is to be employed as a bayonet, the tip is screwed into the smaller end of the tube, as is shown in Fig. 4, and the bayonet is clasped or locked to the gun-barrel in the manner heretofore described; but if it be desired to use the article as a telescope the tip or point is unscrewed and removed from the tube and the direction of the latter is reversed, and such tube is secured to the side of the barrel or on top thereof alongside the stock. While I may employ any suitable means for so mounting the device, I prefer to employ the mechanism shown clearly in detail in Fig. 8. This supporter is adjustable to provide for elevation, variations in the velocity of the wind, and the like, and, referring to said figure, the numeral 27 indicates a block similar to the side plate of the rifle, as shown in Fig. 1, said block having an open central portion 28 and a slotted top plate 29. Within the open portion 28 is mounted the sliding block 30, operated by means of the screw 31, having a small thumb-wheel 32. Rotatably mounted upon the block 30 is a sleeve 33, preferably conical in form, the interior surface of said sleeve being threaded to receive the screw-threaded post 34, which post carries a split ring 35, having a small adjusting-nut 36. The tube forming the body of the telescope is clamped within the split ring 35, and by rotating the screw-rod 31 the block 30 may be shifted to move the mounted parts carrying the telescope toward and from the rifle-barrel. In order to elevate the telescope, it is only necessary to rotate the sleeve 33, which is loosely secured to the block 30 by the screw-pin 37, and the threaded post 34 will be fed vertically up and down in the sleeve, as may be desired. It may be necessary to support the larger end of the tube, and in such case a catch or support 38 may be secured through means of the small clamping-bracket 39 to the stock of the rifle.

It will be noted that by reversing the direction of the cylindrical tube the smaller lens is brought close to the eye and the article may then be used as a telescope. I wish it to be understood that I do not confine myself in this invention to the precise manner herein recited of securing the article in place either when used as a bayonet or as a telescope; nor do I limit myself to the precise details of construction regarding the tube, the location of the lens, or the tip thereof.

The many advantages incident to my improved construction will be readily appreciated, especially by those familiar with military affairs, as the article when used as a bayonet will increase the length of the modern rifle now in use and will increase the weight of the arm to but a comparatively slight degree, owing to the body of the bayonet being tubular in form, and at the same time when the tip is removed and the article placed in position to be used as a telescope greater accuracy in shooting will be attained, while with such a mounting as I have described allowance may be made for variations in the velocity of the wind and elevation. It will further be noted that the article may be added or fixed to any of the modern military rifles without in any way changing the construction or form of such rifles.

What I claim is—

1. A device of the class described comprising both a telescope and a bayonet, and means for adjustably securing the device alongside a gun-barrel.

2. A device of the class described comprising a tubular body portion, a removable bayonet-tip, and a magnifying-lens within the body portion.

3. A device of the class described comprising a tubular body portion, means for attaching the same to the barrel of a rifle or similar arm, magnifying-lens within the body portion, and a removable bayonet-tip for the body portion.

4. A device of the class described comprising the tubular body portion, a plurality of lenses held spaced apart within the body portion, means for securing said body portion to a rifle or similar arm, and a removable bayonet-tip designed to be secured at the end of the tubular portion.

5. A device of the class described comprising a tubular body portion, lenses arranged within the body portion, a bayonet-tip secured at one end of such body, means for detachably securing the body-tube to the barrel of a rifle or the like, and a guard having seats for both the barrel of the rifle and the tubular body.

6. A device of the class described comprising a tapering tubular body portion, a relatively large lens secured within the body portion near the large end thereof, a second lens secured within the body portion near the narrowed end thereof, a removable bayonet-tip threaded into the narrowed end of such tubular body portion, and means for detachably securing the device to a rifle.

7. The combination with a rifle or similar arm, of a combined bayonet and telescope comprising a tubular body portion, a bayonet-tip therefor, lenses arranged within the body portion, means for securing such body portion to the end of a rifle-barrel, and means for securing such body portion in a reversed position to the rifle when the tip is removed and the device is used as a telescope.

In testimony whereof I have signed my name to this specification in the presence of two subscribing witnesses.

FREDERICK W. STILLWELL.

Witnesses:
E. B. DECKER,
GEORGE H. RUSS, Jr.